United States Patent [19]

Hay, II et al.

[11] Patent Number: 4,575,100

[45] Date of Patent: Mar. 11, 1986

[54] SEAL ASSEMBLY WHICH IS HYDRAULICALLY ACTUATED

[75] Inventors: Robert A. Hay, II, Midland; Albert C. Dowell, Mount Pleasant, both of Mich.

[73] Assignee: The Dow Chemical Company, Midland, Mich.

[21] Appl. No.: 668,582

[22] Filed: Nov. 5, 1984

[51] Int. Cl.⁴ .............................................. F16J 15/34
[52] U.S. Cl. .................... 277/65; 277/96.1; 277/133
[58] Field of Search ................. 277/65, 96.1, 74, 133, 277/96.2

[56] References Cited

U.S. PATENT DOCUMENTS

| | | | |
|---|---|---|---|
| 2,352,784 | 7/1944 | Geyer | 277/133 |
| 3,971,563 | 7/1976 | Sugimura | 277/74 |
| 3,988,026 | 10/1976 | Kemp | 277/65 |
| 4,189,158 | 2/1980 | Roussin | 277/74 |
| 4,365,815 | 12/1982 | Scott | 277/96.2 |
| 4,424,973 | 7/1984 | Heilala | 277/96.1 |
| 4,515,377 | 5/1985 | Johnson | 277/65 |
| 4,531,746 | 7/1985 | Amdall | 277/74 |
| 4,573,764 | 6/1985 | Albers | 277/96.1 |

*Primary Examiner*—Robert I. Smith
*Attorney, Agent, or Firm*—R. B. Ingraham; T. J. Mielke

[57] ABSTRACT

Improved shaft seal is provided wherein generally radially extending distendable diaphragms are used to adjust the sealed gap. A flushing lubricant is provided. The seal is particularly suited for use in gear pumps handling viscous materials such as heat plastified thermoplastics.

10 Claims, 6 Drawing Figures

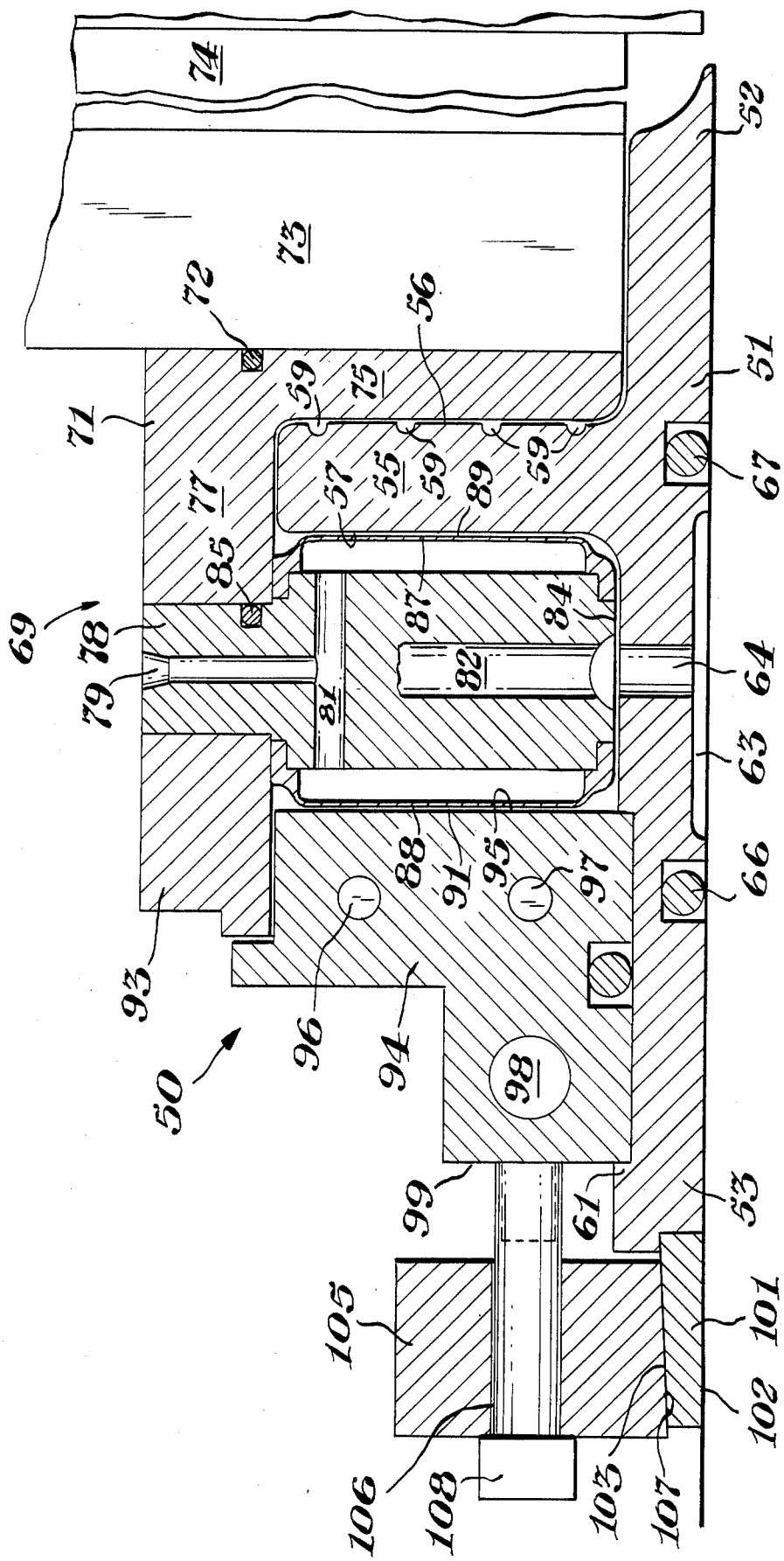

SEAL ASSEMBLY WHICH IS HYDRAULICALLY ACTUATED

In the operation of pumps, particularly gear pumps where there is relatively high pressure differential across the seal, significant difficulty often occurs in maintaining the desired seal. For example, gear pumps handling heat plastified thermoplastic resins often have product lubricated bearings; that is, the heat plastified polymer is used to lubricate the bearings and a controlled flow of the polymer over the bearings is utilized, and oftentimes the material used for lubrication is recirculated, that is returned to the inlet of the gear pump. However, in the event of leakage around the shaft seal, thermoplastic polymer can harden and form hardened masses of polymer which generally represent waste and cause labor for their removal. Repair of such seals is often time consuming and expensive.

It would be desirable if there were available an improved shaft seal capable of operation at high pressure.

It would also be desirable if there were available an improved shaft seal whereby any leakage could be controlled.

It would be desirable if there were available a seal wherein any leakage therethrough were not the product being handled.

These features and other advantages in accordance with the present invention are achieved in a shaft seal, the shaft seal comprising a sleeve generally having rotational symmetry about an axis, the sleeve adapted to be affixed to a shaft, the sleeve having a generally radially extending flange portion and a bore; the radially extending flange having a first side and a second side, the first side being a generally annular planar first face, the second side having a similar or second face defining at least one generally back pumping generally spiral groove; a first clamping means for clamping said sleeve to a shaft disposed within the bore; a generally annular second clamping means disposed remote from the second side, the second clamping means defining a generally radially extending annular third face spaced from the first face of the annular flange, the third face being adjacent and spaced apart from the first face, the third face and sleeve defining an outwardly opening annular recess of generally elongate rectangular cross sectional configuration; a fixed housing adapted to receive a shaft passing through the sleeve, the fixed housing being disposed about at least a portion of the sleeve; the fixed housing defining a generally radially outwardly extending annular fourth face generally parallel to and spaced from the second face defining the spiral groove, the housing having supported thereon a generally annular sealing member, the annular sealing member having affixed thereto in liquid tight engagement at least one annular diaphragm, the annular diaphragm having at least one annular radially extending surface disposed adjacent the first face of the flange, the annular diaphragm being in communication with a first fluid supply passage; a second fluid supply passage communicating between space external of the means supporting the diaphragm and space adjacent the sleeve, first fluid discharge means located generally at a peripheral location communicating with a space between first and third faces and a second fluid discharge means at a generally peripheral location communicating with space between the second and fourth faces, where upon the application of fluid pressure to the first fluid supply passage, the diaphragm is displaced toward the third face.

Also contemplated within the scope of the present invention are seals employing two or more such diaphragms.

Further features and advantages of the present invention will become more apparent from the following examples taken in connection with the drawing wherein:

FIG. 2 is a representation of a cross sectional view of one side of an axial section of a seal such as is depicted in FIG. 1;

Figure 1:
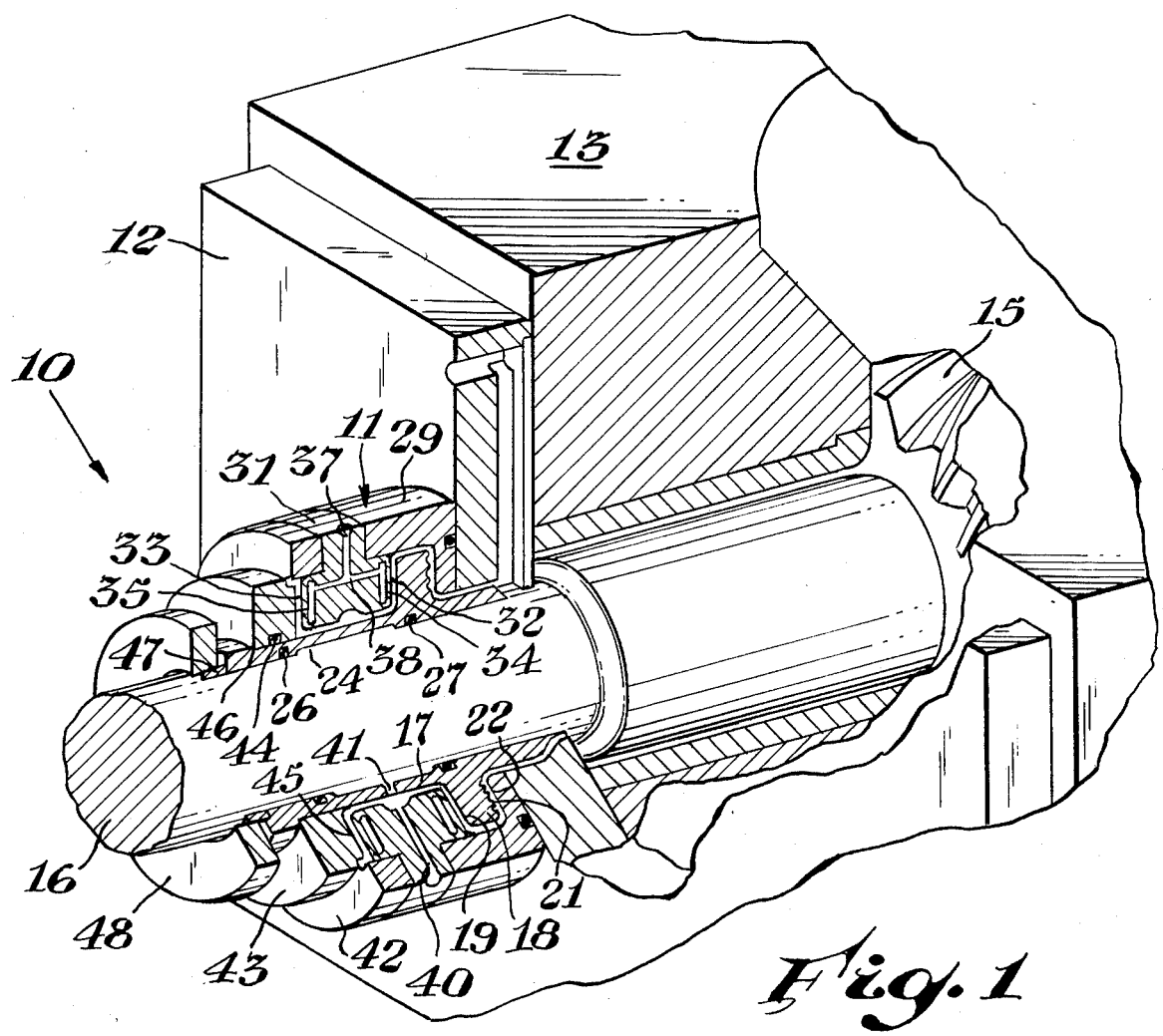
FIG. 1 is a schematic cutaway view of a seal in accordance with the present invention affixed to one shaft of a gear pump.

In FIG. 1 there is depicted a seal assembly in accordance with the invention generally designated by the reference numeral 10. The seal assembly 10 has a housing 11 affixed to a gear pump end plate 12 which in turn is affixed to gear pump 13. The pump 13 has a rotor 15 having affixed thereto a shaft 16. The seal assembly 10 has a sleeve 17 coaxially affixed to the shaft 16. The sleeve 17 has an annular flange 18. The flange 18 extends generally radially outward from the axis of the shaft 16. The flange 18 defines a first face 19 disposed generally remotely from the pump 13 and a second face 21 disposed toward the pump 13. The second face 21 defines a spiral groove 22. The sleeve 17 defines an inwardly opening annular channel 24, the channel 24 being coaxial with the sleeve 17 and the shaft 16. A first static sealing means 26 and a second static sealing means 27 which advantageously are "O" rings are disposed in either side of the annular channel 24. The housing 11 comprises a first annular member 29 having a generally "L" shaped cross sectional configuration wherein one leg of the L is parallel to and spaced from face 21 of sleeve 17, and the second leg of the L encloses flange 18 of the sleeve 17. Adjacent the portion 29 is a diaphragm support 31. Diaphragm support 31 is coaxially disposed relative to sleeve 17 and member 29. Support 31 has an annular configuration. The diaphragm support 31 supports a first diaphragm 32 and a second diaphragm 33. The diaphragms 32 and 33 are disposed at opposite ends of the diaphragm support 31. The diaphragm support 31 and diaphragms 32 and 33 define a first annular cavity 34 adjacent diaphragm 32 and a second annular cavity 35 adjacent diaphragm 33 respectively. The cavities 34 and 35 are in communication with hydraulic fluid source passage 37 by means of a cross passage 38. Also defined by the diaphragm support is a generally radially extending passage 40 which is in communication with space between diaphragm support 31, the sleeve 17 and the annular channel 24 by means of passage 41 in sleeve 17. The diaphragm support 31 is clamped into position by means of clamp ring 42 and bolts not shown. Disposed adjacent the clamp ring 42 is a sleeve clamp 43 of split construction which is sealed to the sleeve by means of O ring 44 and engages a shoulder 46 on the sleeve 17. The shoulder 46 prevents movement of the sleeve clamp 43 away from diaphragm support 31. Sleeve clamp 43 has a generally radially extending face 45 parallel to and spaced from diaphragm 33. A lock ring 47 is disposed on shaft 16 adjacent sleeve 17 and remote from flange 18. The lock ring has a tapered face remote from the shaft 16. A locking collar 48 having a matching tapered face is disposed over the lock ring 47, the locking collar being drawn toward the sleeve clamp 43 by means of a plurality of bolts, not shown.

In operation of the apparatus such as schematically depicted in FIG. 1, product is fed to the gear pump in heat plastified form. A small portion of the product is employed to lubricate the bearings, this product being recirculated to the inlet of the pump. A flush material, for example mineral oil, is supplied to passageway 40 and a hydraulic fluid such as oil is passed to passageway 37 to cause the diaphragms 32 and 33 to distend and provide a desired clearance between the diaphragms and adjacent faces. Flush fluid is passed through passageway 40 at a desired rate. In the event that the pressure or volume of the flush fluid is less than desired, the spiral groove 22 of the flange 17 is arranged in such a way that the product has a tendency to be pumped back toward the pump and away from the sleeve. There is a controlled weep of the flush material between clamp ring 42 and sleeve clamp 43. As the flush material may be readily selected from liquids that are readily handled, the problem of polymer leakage has been eliminated. The minor amount of flush fluid lost to the product generally can be tolerated with no difficulty if a compatible material is employed.

In FIG. 2 there is depicted a partial cross section view of an alternate embodiment of the invention generally designated by the reference numeral 50. FIG. 2 is generally equivalent to the upper sectioned portion of a seal as shown in FIG. 1. The embodiment 50 comprises a sleeve 51 having a first or pump end 52 and a second or remote end 53. The sleeve 51 has disposed thereon a radially disposed flange 55. The flange 55 has a pump adjacent face 56 and a pump remote face 57. The face 56 has formed therein a spiral groove 59. The sleeve 51 adjacent remote end 53 defines an annular shoulder 61. Generally centrally disposed between ends 52 and 53 is an inwardly facing annular channel 63 in the sleeve 51. A radially extending passage 64 provides communication between the annular channel 63 and space external to the sleeve 51. Sealing means 66 and 67 are disposed on either side of the annular channel 63. Beneficially the sealing means comprises annular recesses having O rings disposed therein. Disposed about a major portion of the sleeve 51 is a housing generally indicated by the reference numeral 69. The housing 69 comprises a first annular member 71 having a generally L-shaped cross section configuration wherein one leg 75 of the L has disposed therein a sealing means 72 comprising a groove in the annular member 71 and an O ring. The leg 75 of the L is affixed to a pump end plate 73 which in turn is affixed to a pump body 74. The leg 75 extends generally parallel to face 56 of the sleeve 51 and is spaced therefrom. The annular member 71 has a second leg 77 which encloses the flange 55 of the sleeve 51 and is spaced therefrom. Adjacent the annular member 71 and remote from the pump end plate 73 is disposed a diaphragm support member 78. The diaphragm support member 78 is also of annular configuration. In the diaphragm support member 78 is defined therin hydraulic fluid passageway 79 which extends radially inward to a cross passage 81 generally about midway through the cross section configuration of the diaphragm support means 78. There is schematically represented a flush fluid passage 82 which extends from an inner surface 84 of the diaphragm support means 78 to space external thereto. The passage 82 is partially depicted in FIG. 2 and corresponds to passageway 40 of FIG. 1. The diaphragm support means 78 has disposed therein a sealing means 85 adjacent leg 77 of annular member 71. Beneficially, the sealing means 85 comprises a groove and an O ring. The diaphragm support means 78 has affixed thereto, beneficially by brazing, a first diaphragm 87 and a second diaphragm 88. As depicted in FIG. 2, the diaphragms 87 and 88 are disposed on either side of the diaphragm support 78. The diaphragms 87 and 88 are of generally like dimension and configuration, and diaphragm 87 is disposed within the annular member 71. The diaphragm 87 has an external face 89 which is spaced from and adjacent face 57 of sleeve 51. The diaphragm 88 has an external face 91 remotely disposed from the flange 55 of sleeve 51. The diaphragms 87 and 88 have the general configuration of a flanged ring and are affixed to the diaphragm support by means of brazing or welding to provide fluid tight annular cavities which can receive or discharge fluid only through the passage 79. A diaphragm support clamp ring 93 is disposed adjacent the diaphragm support means 78 and is affixed to leg 77 of the annular member 71 by means of bolts passing through the ring 93, through the diaphragm support member 78, and through leg 77, and into threaded openings of pump end plate 73. A sleeve clamp ring 94 is disposed adjacent the second end 53 of the sleeve 51. The clamp ring 94 is of split configuration and has a radially extending face 95 disposed generally parallel and spaced from face 91 of diaphragm 88. The split clamp ring 94 extends to about the ring 93 and is spaced slightly therefrom, the spacing being exaggerated in the figure. The split clamp ring 94 has for alignment purposes dowels 96 and 97 extending in a generally tangential direction. A bolt hole 98 is defined in the clamp ring 94 for purposes of bolting halves together. The clamp ring 94 has a remote radially extending face 99, a portion of which is adjacent the second end 53 of the sleeve 51. A portion of the face 99 engages the shoulder 61. Adjacent and in contact with second end 53 is a locking ring 101. The locking ring 101 has an inner cylindrical face 102 and an external frustoconical face 103. The face 103 tapers away from the end 53. An annular locking collar 105 is disposed about the locking ring 101. The locking collar 105 has disposed therein a plurality of bolt holes 106 which extend in an axial direction. The locking collar 105 has a frustoconical inner face 107 having a like taper to face 103 of the locking ring 101. Beneficially the locking ring 101 is not a complete annulus but is relieved by a generally axial saw cut passing therethrough. A plurality of bolts 108 passes through the locking collar 105 and threadably engages the split clamp ring 94 permitting the locking collar to be forced toward the second end 53 of sleeve 51 and firmly affixes sleeve 51 to a shaft. The saw cut in the locking ring 101 eliminates any requirement to overcome compressive strength of a complete annulus.

Figure 3:
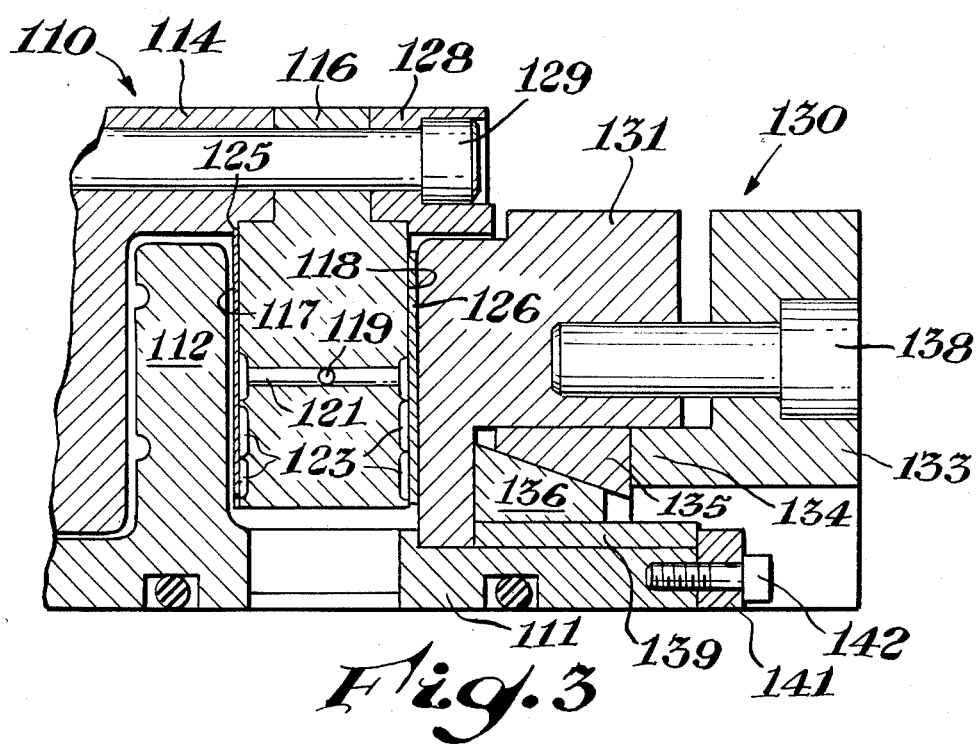
FIG. 3 is a section similar to FIG. 2 of an alternate embodiment of the invention.

In FIG. 3 there is depicted a fragmentary sectional view of a seal in accordance with the present invention generally designated by the reference numeral 110. The seal 110 has a sleeve 111. The sleeve 111 is of the same configuration as the sleeve of FIG. 2. The sleeve 111 has a flange 112. A generally annular housing 114 surrounds the flange 112. The housing 114 being of generally similar configuration to the member 71 of FIG. 2 and member 29 of FIG. 1. A diaphragm support means 116 is disposed adjacent the housing 114. The diaphragm support means 116 is of annular configuration and has a first diaphragm supporting face 117 which is disposed adjacent the flange 112.

A second diaphragm supporting face 118 is disposed remote from face 117, and faces 117 and 118 are parallel. A hydraulic supply fluid channel 119 is formed within the diaphragm support 116 and is in communication with a generally axially disposed channel 121 which communicates with faces 117 and 118. A plurality of annular recesses 123 are formed in faces 117 and 118. Diaphragms 125 and 126 are affixed to the diaphragm support 116 by welding at the inner and outer edges of the faces 117 and 118 respectively. Adjacent the diaphragm support 116 is a clamp ring 128. A cap screw or bolt 129 passes through the clamp ring, through the diaphragm support 116, through the housing 114, and anchors in a pump end plate not shown. An annular seal face member 131 is disposed adjacent diaphragm 126 and is maintained in position and is adjustably positioned by clamping assembly 130 which comprises an annular collar 133. The annular collar 133 has a generally rectangular cross sectional configuration with an axially projecting flange designated by the reference numeral 134. The flange 134 projects toward diaphragm 126 and engages a first split annular wedging member 135 which in turn engages a second split annular wedge member 136. A plurality of bolts or cap screws 138 passes through collar 130 and threadably engages member 131. A split annular spacer 139 is disposed beneath annular wedge member 136. The spacer 139 engages face member 131 at a location generally adjacent diaphragm 126. A spacer retainer ring 141 having an inside diameter slightly larger than the inside diameter of the sleeve 111 is affixed to the end of the sleeve by a plurality of cap screws 142. The retainer ring 141 engages the spacer 139 at a location opposed to the location of contact of the spacer 139 and remote from member 131.

Figure 4:
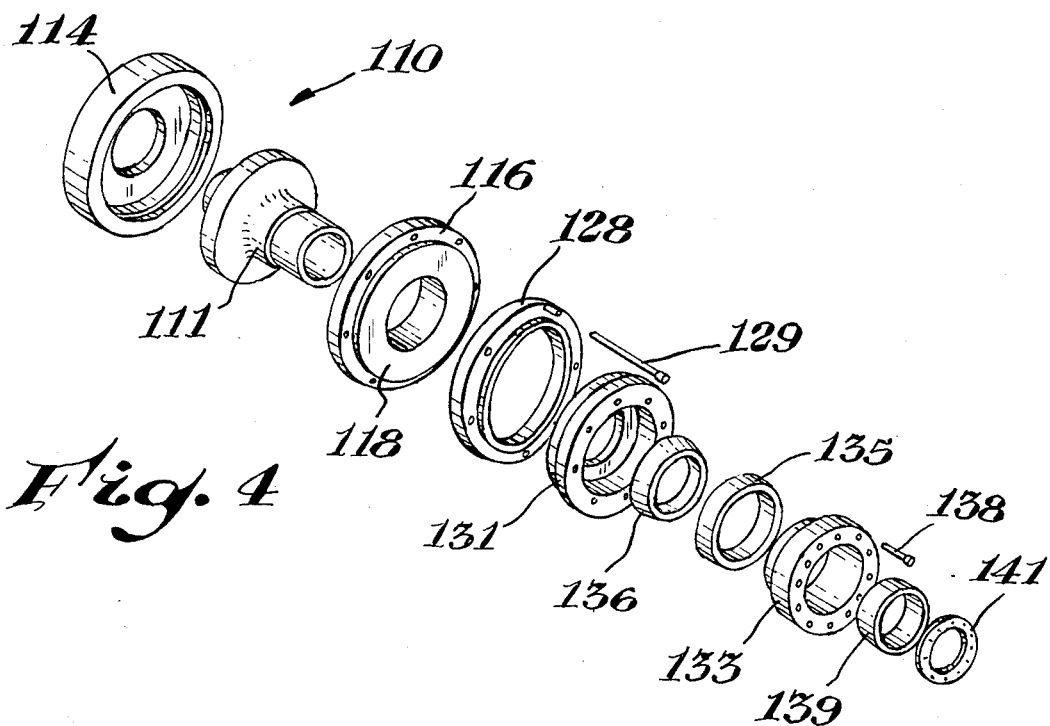
FIG. 4 is an exploded view of a seal in accordance with FIG. 3.

FIG. 4 is a schematic exploded isometric view of the seal of FIG. 3.

Figure 5:
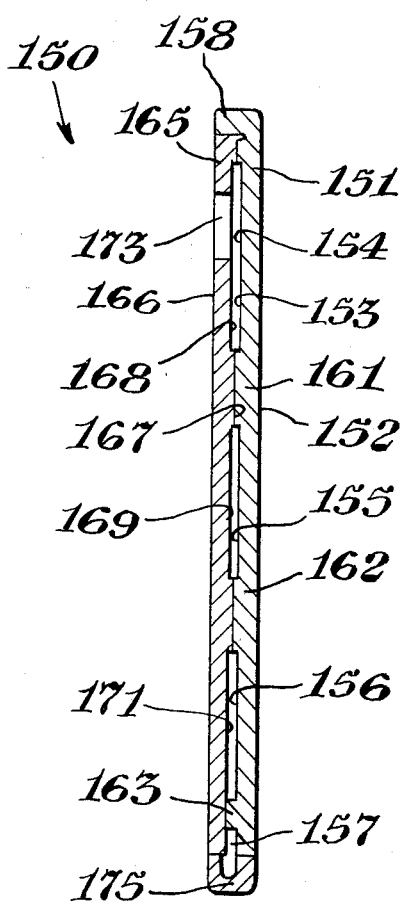
FIG. 5 is a cross section of one side of a diaphragm suitable for use in the embodiments of FIGS. 3 and 4.

FIG. 5 is a sectional view of a seal diaphragm assembly generally designated by the reference numeral 150. The diaphragm comprises a first member 151 of generally planar annular configuration having a flush engaging surface 152 and an internal surface 153. The internal surface 153 defines 4 annular channel recesses 154, 155, 156 and 157. The recesses 154, 155, 156 and 157 are coaxial with the annular diaphragm 150. At the outer edge of the diaphragm assembly 150, the first member 151 defines an axially extending annular flange 158. The first member 151 has concentric annular lands 161, 162 and 163 which serve to define the annular recesses 154, 155, 156 and 157. The diaphragm 150 has a diaphragm support engaging member 165. The member 165 is generally coextensive with first member 151 and has a support engaging face 166. The member 165 has an internal face 167 having formed therein concentric annular recesses 168, 169 and 171, corresponding to recesses 154, 155, 156 of member 151. Member 165 has defined therein a generally circular opening 173. The diaphragm 150 employs a third member 175 which is annular and of U-shaped cross sectional configuration and serves to join diaphragm members 151 and 165 at location remote from the flange 158. Member 175 is affixed by weldment as is flange 158 affixed to member 165 in a similar manner. Diaphragms such as the diaphragm 150 can be affixed to diaphragm support by any means including welding.

Figure 6:
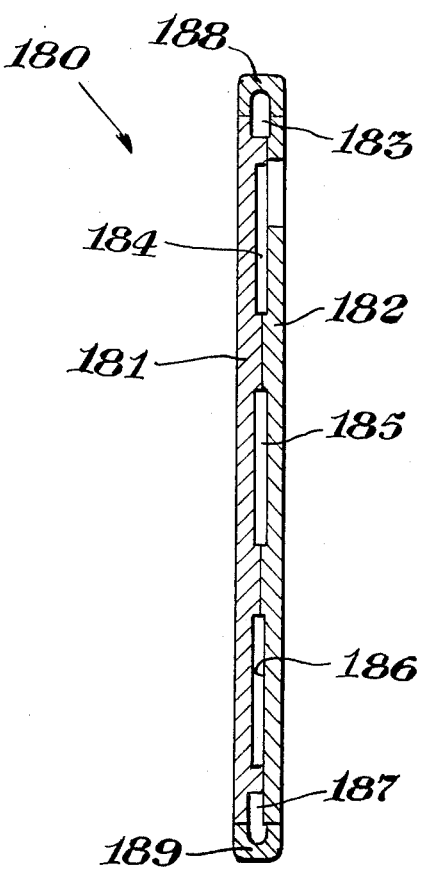
FIG. 6 is an alternate construction for diaphragms suitable for the embodiments of FIGS. 3 and 4.

FIG. 6 depicts a view of an alternate embodiment of a diaphragm in accordance with the present invention similar to that depicted in FIG. 5 and generally designated by the reference numeral 180. Diaphragm 180 comprises a first or outer generally planar annular member 181 and a second or support engaging member 182. Generally coextensive with member 181, the members 181 and 182 define 5 annular concentric spaces 183, 184, 185 and 186 and 187. The members 181 and 182 are joined in their outer periphery by an annular U-shaped member 188 and welded thereto. Member 188 has an inwardly directed U configuration, and on the inner side annular member 189 in the U is directed outwardly.

The diaphragm of FIG. 6 is employed in the same manner as the diaphragm of FIG. 5.

As depicted in FIGS. 1, 2 and 3, a weep gap is provided between the clamp ring such as ring 42 of FIG. 1 and ring 43 of FIG. 1. In all of the Figures this weep gap is exaggerated. In practical operation this gap is sufficiently small that the principle pressure drop between the pump and space external to the pump or similar vessel having material under pressure occurs at such a gap where the flushing fluid is permitted to weep at a controllable rate. If it is desired for any reason that such a gap is large and significant pressure drop occurs across the face of the flange sleeve, in some instances it may be necessary to independently apply fluid under pressure to the first and second diaphragms. For most practical operation the major pressure drop occurs across the gap between the ring members and a single hydraulic source is satisfactory.

Seals in accordance with the present invention are beneficially employed in handling a variety of fluids which may be at high or low temperatures, high or low viscosities, and are particularly desirable when materials of high viscosities are employed, such as for gear pumps moving heat plastified polymeric materials.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A shaft seal, the shaft seal comprising
a sleeve generally having rotational symmetry about an axis, the sleeve adapted to be affixed to a shaft, the sleeve having a generally radially extending flange portion and a bore;
the radially extending flange having a first side and a second side, the first side being a generally annular planar first face, the second side having a similar or second face defining at least one generally back pumping generally spiral groove;
a first clamping means for clamping said sleeve to a shaft disposed within the bore;
a generally annular second clamping means disposed remote from the second side, the second clamping means defining a generally radially extending annular third face spaced from the first face of the annular flange, the third face being adjacent and spaced apart from the first face, the third face and sleeve defining an outwardly opening annular recess of generally elongate rectangular cross sectional configuration;

a fixed housing adapted to receive a shaft passing through the sleeve, the fixed housing being disposed about at least a portion of the sleeve; the fixed housing defining a generally radially outwardly extending annular fourth face generally parallel to and spaced from the second face defining the spiral groove, the housing having supported thereon a generally annular sealing member, the annular sealing member having affixed thereto in liquid tight engagement at least one annular diaphragm, the annular diaphragm having at least one annular radially extending surface disposed adjacent the first face of the flange, the annular diaphragm being in communication with a first fluid supply passage;

a second fluid supply passage communicating between space external of the means supporting the diaphragm and space adjacent the sleeve, first fluid discharge means located generally at a peripheral location communicating with a space between first and third faces and a second fluid discharge means at a generally peripheral location communicating with space between the second and fourth faces;

where upon the application of fluid pressure to the first fluid supply passage, the diaphragm is displaced toward the third face.

2. The shaft seal of claim 1 wherein two diaphragms are employed, the second diaphragm being in fluid tight engagement with the diaphragm support and disposed between the second and fourth faces and in communication with the first fluid supply passage.

3. The shaft seal of claim 1 wherein the sleeve defines an internal annular passageway disposed within the bore.

4. The shaft seal of claim 3 wherein sealing means are disposed circumferentially therein on either side of the annular passage.

5. The shaft seal of claim 1 wherein the first clamping means comprises a first generally annular ring having an internal cylindrical surface having a diameter approximating the diameter of the bore of the sleeve, an external frustoconical surface disposed generally adjacent first and third faces, a second annular ring having an internal frustoconical surface which is generally parallel to the surface of the first annular ring and having a slightly smaller inside diameter than the maximum diameter of the first annular ring and means to force the second annular ring over the first annular ring and affix the second annular ring to means defining the third face.

6. The shaft seal of claim 1 wherein the fixed housing is affixed to a pump.

7. The shaft seal of claim 6 having a pump shaft therein.

8. The shaft seal of claim 7 wherein the second fluid discharge communicates with a pump lubricant passage.

9. The shaft seal of claim 1 wherein the second clamping means is affixed to the sleeve.

10. The shaft seal of claim 9 wherein the second clamp ring is affixed to the diaphragm support.

* * * * *